United States Patent
Giwosky

[15] 3,654,954
[45] Apr. 11, 1972

[54] METERING VALVE ARRANGEMENT FOR OIL CONTROL

[72] Inventor: Harry L. Giwosky, Milwaukee, Wis.
[73] Assignee: Controls Company of America, Melrose Park, Ill.
[22] Filed: Jan. 4, 1971
[21] Appl. No.: 103,632

[52] U.S. Cl. .............................. 137/400, 251/229, 251/248, 251/256
[51] Int. Cl. ..................................................... F16k 31/524
[58] Field of Search .................. 137/386, 400, 409; 251/229, 251/253, 256

[56] References Cited

UNITED STATES PATENTS

| | | | |
|---|---|---|---|
| 2,155,761 | 4/1939 | Johnson | 251/256 |
| 2,301,041 | 11/1942 | Hann | 251/256 |
| 2,808,224 | 10/1957 | Landon | 251/253 X |
| 3,077,897 | 2/1963 | Jaschinsky et al. | 137/400 |

Primary Examiner—M. Cary Nelson
Assistant Examiner—David R. Matthews
Attorney—John W. Michael, Gerrit D. Foster, Bayard H. Michael, Paul R. Puerner, Joseph A. Gemignani, Andrew O. Riteris and Spencer B. Michael

[57] ABSTRACT

The float controls the inlet valve to maintain a constant level in the float chamber. Flow from the chamber is metered by the stem which is positioned by an idler lever which follows the configuration of the cam carried by a gear segment which is rotated by pinion gear on the lower end of the manually actuated knob. The cam contour is easily controlled and will remain the same in service. The cam is spring loaded against adjusting screws positioned to permit independent adjustment of the low (pilot) and high flow rates. The adjusting screws are respectively accessible and adjustable through the knob when it is in the pilot and high flow positions.

5 Claims, 5 Drawing Figures

Inventor
Harry L. Giwosky
By Bayard H. Michael
Attorney

Inventor
Harry L. Giwosky
By Bayard H. Michael
Attorney

METERING VALVE ARRANGEMENT FOR OIL CONTROL

BACKGROUND OF INVENTION

The control (positioning) of the metering stem in oil control valves has generally involved a cast cam under the cover and actuated by the knob. The tooling cost is considerable and discourages customizing the controls. Since the cast cam is of soft metal, service life is something of a problem. It is generally desirable to have a detent action in the pilot position to give "feel" to the control. With the soft metal cam the force needed to get out of the detent was high. The operating force on the knob tended to be high.

SUMMARY OF INVENTION

With the construction described in the abstract lower actuating forces are required on the knob while obtaining a good detent "feel" at pilot position and the advantage of a very accurate cam configuration which is readily adjusted to give the precise desired flow at low and high, than at all rates of flow. Customized flow characteristics are obtained at modest cost since it is only necessary to change the blanking die used in stamping the cam profile. The cam is preferably stainless steel and will not wear in service.

DESCRIPTION OF PREFERRED EMBODIMENT

Figure 1:
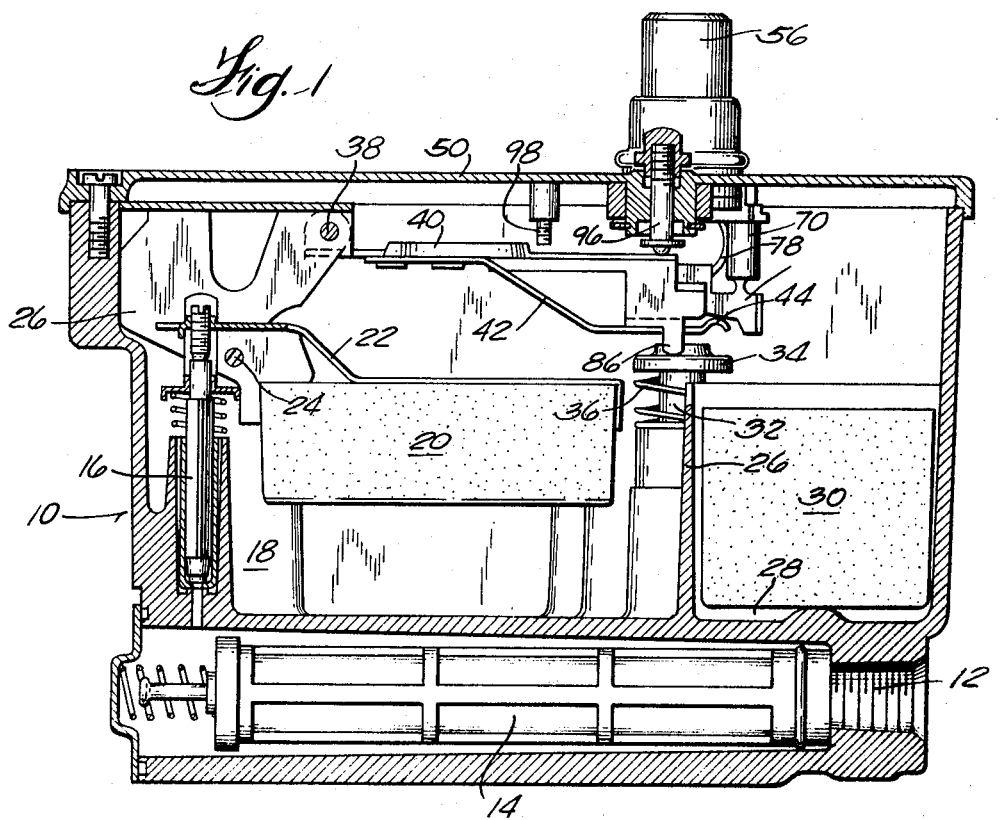
FIG. 1 is a vertical section through the control with some parts omitted for clarity.
Figure 2:
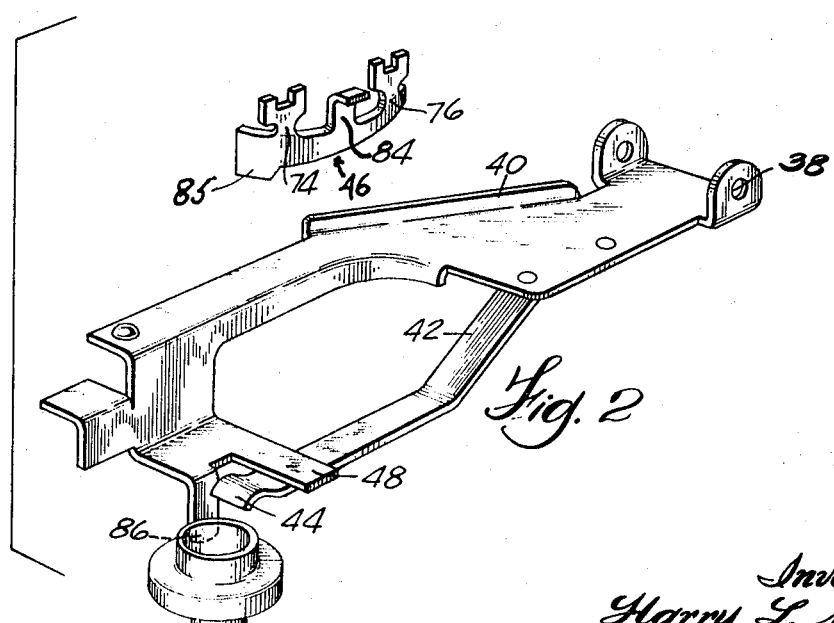
FIG. 2 is an exploded perspective of some principal parts.
Figure 3:
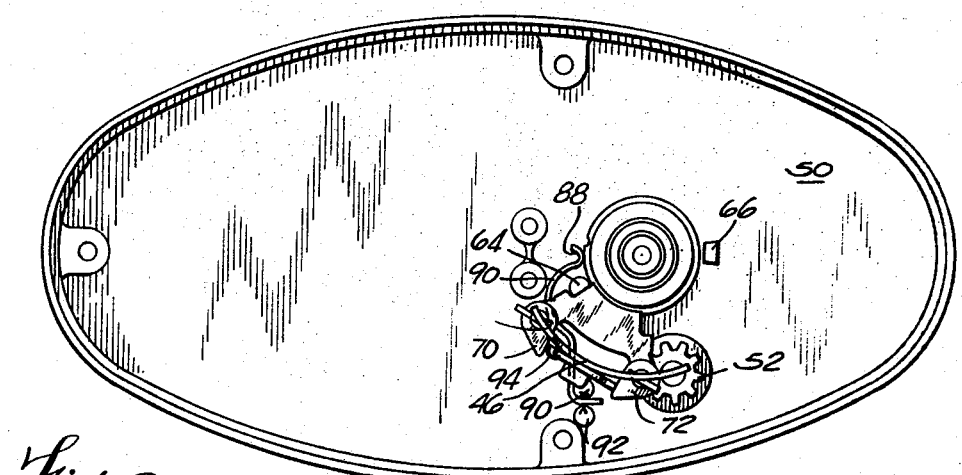
FIG. 3 is a bottom plan view from below the cover.
Figure 4:
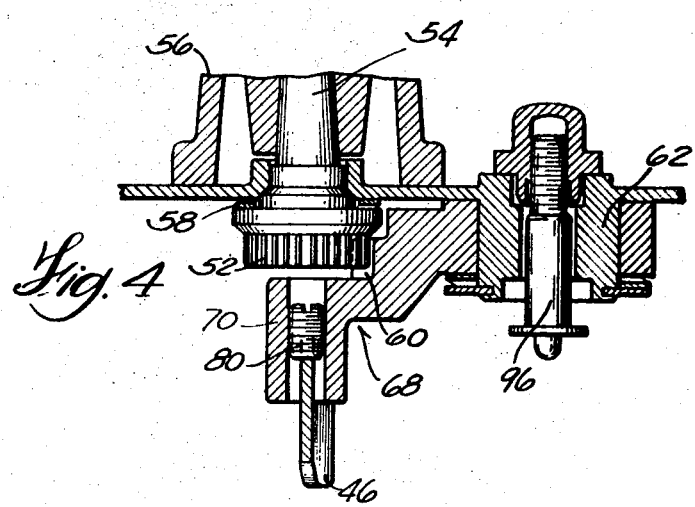
FIG. 4 is an enlarged sectional view through the knob and cam-carrying segment.
Figure 5:
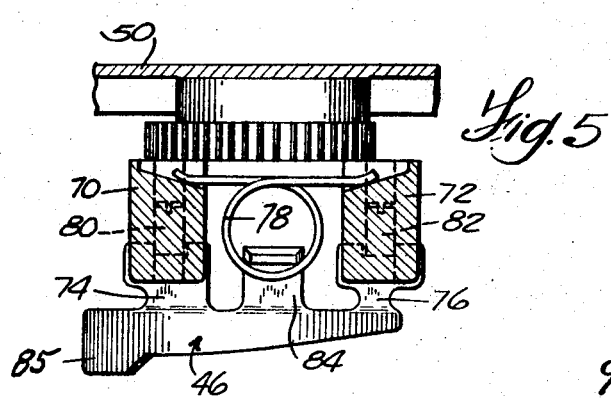
FIG. 5 is a plan view of the segment and cam.

Oil flows into control 10 through inlet 12 past filter or strainer 14 and inlet valve 16 and to chamber 18. Float 20 in the chamber is mounted on bracket 22 pivoted at 24 to actuate the inlet valve to maintain a constant level in chamber 18. Should the inlet valve fail to properly close off oil flow for any reason, the level will rise in chamber 18 until it flows over dam 26 into the safety chamber 28 to float 30, which will then rise and actuate a safety grip mechanism (not shown) to strike the inlet valve and hammer it closed. Flow from chamber 18 is regulated by metering stem 32 which is provided with a spring seat 34 against which spring 36 acts to bias the metering stem open. The precise details of the metering stem are of no concern here. The only thing to be concerned with is that it is the vertical position of the metering stem which is of importance in obtaining the proper flow characteristics to the burner. The metering stem should have a proper shutoff, a proper low flow condition, a proper high flow condition, and an accurate control of the flow rate between low and high. The present invention is concerned with proper actuation of the metering stem.

The main float 20 is pivoted at pin 24 which is carried on a bracket 26 secured in the housing. This bracket also includes a pivot 38 upon which an idler or transfer lever 40 is mounted. A formed leaf spring 42 is riveted to the lever 40 and has a rounded or actuating end 44 which rides on the surface of cam 46 which determines the flow rates. The spring is biased towards the lever 40 with the lever and spring normally moving as one by reason of the finger 48 bent out from the lever to overlie the spring. The spring, however, can be moved away from the lever. Gravity will bias the lever to rest on the top of the spring seat 34 mounted on top of the metering stem 32.

The control cover 50 is die cast for rigidity and immediately above the metering stem there is a pinion gear 52 mounted on the underside of the cover 50 with the gear shaft 54 extending through a hole in the cover into the socket formed in knob 56 with a push fit capturing the wave-type spring washer 58 between the pinion and the underside of the cover to hold the knob down against the cover. This pinion engages the gear segment 60 rotatably mounted on post 62 for rotation between limiting positions determined by engagement of the segment with stops 64, 66 cast on the underside of the cover. Therefore, turning the knob 56 swings the gear segment through its range of movement. The user is only concerned with the rotational position of the knob and the cover can bear suitable indicia indicating "off," "pilot," ranging on up to high flow rates.

The gear segment 60 is a part of a cam holder 68 which includes depending legs 70,72 which are slotted to receive the arms 74,76 which stand up from the top surface of the cam 46. These arms are notched to straddle the adjusting screws 80,82 which serve to position the legs and, hence, the cam. The legs 70,72 depending from the cam holder are also slotted to receive the ends of spring 78, which is formed to loop over center arm 84 standing up from the cam. The spring acts to lift the cam upwardly against the adjusting screws 80,82. The adjusting screws are accessible from above in the following manner. When the knob is turned to the pilot position, the adjusting screw 80 will directly underlie the hole through the knob and pinion so as to be adjustable from outside the control. Then when the knob is turned to the high fire position, the adjusting screw 82 will directly underlie the hole through the knob and pinion and can be adjusted. The adjustment of either of the adjusting screws 80,82 will not affect the adjustment at the other screw. Therefore, adjusting for the pilot position will not affect the high flow position and vice versa. However, adjusting for the desired rates at "pilot" and "high" must necessarily position the cam 46 to give the desired flow rate determined by the slope of cam 46. It will be noted that the sharply depending portion 85 of the cam constitutes the full "off" position and is designed so as to push the leaf spring down past the full "off" position so that the leaf spring is deflected away from the transfer lever 40. It will be noted that the transfer lever has a depending finger 86 which rides on the top of the metering stem spring seat 34 to actuate the metering stem. Instead of the finger, an adjusting screw can be provided here to insure full closure of the metering stem without any overload being imparted to the metering stem per se. An overtravel by reason of the depending potion 85 of cam 46 is absorbed in the leaf spring.

It will be noted that the hub of the gear segment-cam holder is provided with a notch into which the curved end 88 of the serpentine spring 90 may drop in the pilot position so as to give the desired detent action and corresponding feel to the adjustment of the flow rate. The serpentine spring is anchored between lugs 90,92 cast on the underside of the cover and winds around and pivots on post 94 to give the end the desired amount of spring or flexing action.

The transfer lever is designed to underlie the actuating pin 96 slidably mounted in the cover and projecting through the hub or post 62 which journals the cam holder. This pin will normally just follow the action of the lever as determined by rotation of the knob but, if desired, the knob can return to "high" position and an additional, add-on, control can actuate the pin 96 from on top of the cover to give thermostatic control of the metering stem. While not an important part of this invention, it is to be noted the cover is also provided with adjustable maximum fire stop screw 98 which limits the upward movement of the transfer lever totally apart from any adjustment of the high fire adjusting screw 82 acting on the cam 46. This would be a field adjustment to tailor the maximum output to a particular situation without affecting the desired characteristics in the lower ranges.

I claim:

1. In an oil control valve of the type having a float controlled inlet valve regulating flow into a chamber to maintain a constant level and a metering stem for regulating flow from the chamber in response to vertical movement of the stem, the improvement comprising an arrangement for actuating the stem and including, a manually rotatable knob,
a pinion gear actuated by the knob, a gear segment engaged by the pinion and mounted for rotation between limited positions, a cam holder rotating with the gear segment, a cam carried by the holder and comprising a strip of metal generally curved about the center of rotation of the gear segment with an edge contoured for a desired flow characteristic as the knob is rotated, and means actuated by the cam and acting on the metering stem to impart movement thereto as determined by the cam contour.

2. Apparatus according to claim 1 including means for adjusting the position of the cam relative to the cam holder in the pilot position.

means for adjusting the position of the cam relative to the cam holder in the high flow position, adjustment of either adjusting means in having no effect on the other adjusting means.

3. Apparatus according to claim 2 in which the cam holder includes supports located at the pilot and high flow positions and the cam is retained on the holder at said supports, said supports respectively underlying the knob in the pilot and high flow positions, said adjusting means being located in the supports and comprising an adjusting screw threaded into each support and acting on the cam.

4. Apparatus according to claim 3 in which there is a hole through the knob affording access to said adjusting screws in the pilot and high flow positions.

5. Apparatus according to claim 4 in which the cam includes arms received in said supports and a spring acts on the cam to hold the cam against said adjusting screws.

* * * * *